United States Patent
Burnham

(10) Patent No.: US 10,011,311 B2
(45) Date of Patent: Jul. 3, 2018

(54) QUADRA WALKER

(71) Applicant: Herbert Russell Burnham, Chula Vista, CA (US)

(72) Inventor: Herbert Russell Burnham, Chula Vista, CA (US)

(*) Notice: Subject to any disclaimer, the term of this patent is extended or adjusted under 35 U.S.C. 154(b) by 0 days.

(21) Appl. No.: 14/839,902

(22) Filed: Aug. 28, 2015

(65) Prior Publication Data
US 2017/0057576 A1    Mar. 2, 2017

(51) Int. Cl.
| | |
|---|---|
| *E21C 37/02* | (2006.01) |
| *B62D 57/02* | (2006.01) |
| *A63C 17/00* | (2006.01) |
| *B62B 13/16* | (2006.01) |
| *B62B 15/00* | (2006.01) |
| *B62B 17/06* | (2006.01) |

(52) U.S. Cl.
CPC .......... *B62D 57/02* (2013.01); *A63C 17/0026* (2013.01); *B62B 13/16* (2013.01); *B62B 15/008* (2013.01); *B62B 17/062* (2013.01); *B62B 17/068* (2013.01)

(58) Field of Classification Search
CPC ... B62D 57/028; B62D 57/021; B62D 57/024
USPC .......................................................... 180/8.2
See application file for complete search history.

(56) References Cited

U.S. PATENT DOCUMENTS

| | | | | |
|---|---|---|---|---|
| 4,558,758 A * | 12/1985 | Littman | ................ | B62D 7/026 180/236 |
| 4,662,465 A * | 5/1987 | Stewart | ................ | B62D 57/02 180/8.1 |
| 4,779,691 A * | 10/1988 | Werdner | ................ | B62D 57/00 180/8.1 |
| 5,121,805 A * | 6/1992 | Collie | ................ | B62D 57/024 180/8.1 |
| 5,137,101 A * | 8/1992 | Schaeff | .................... | E02F 9/04 180/8.1 |
| 5,857,533 A * | 1/1999 | Clewett | ................ | B62D 57/00 180/8.1 |
| 7,156,189 B1 * | 1/2007 | Bar-Cohen | ........... | A43B 3/0005 173/102 |
| 8,945,028 B2 * | 2/2015 | Kazerooni | ............ | B25J 9/0006 601/23 |
| 2015/0101871 A1 * | 4/2015 | Riskas | ................ | F15B 21/085 180/8.6 |

* cited by examiner

*Primary Examiner* — Jacob D Knutson

(57) ABSTRACT

A surface walker for human beings consisting of a chassis holding four articulated, movable limbs for walking. Each limb rests on foot, ski or float. Chassis is topped with cushioned seat whereon user lies prone on chest and belly with access to limbs, which are activated with arms and legs. Chassis height and limb length are adjustable. User regulates walking gait, limb stride and motion frequency of limbs. Walker advances on land and water and diverse landscapes. Design incorporates optional computer-controlled power assistance for walker motion and use of mechanical hand for enhanced traction and anchoring effects.

5 Claims, 10 Drawing Sheets

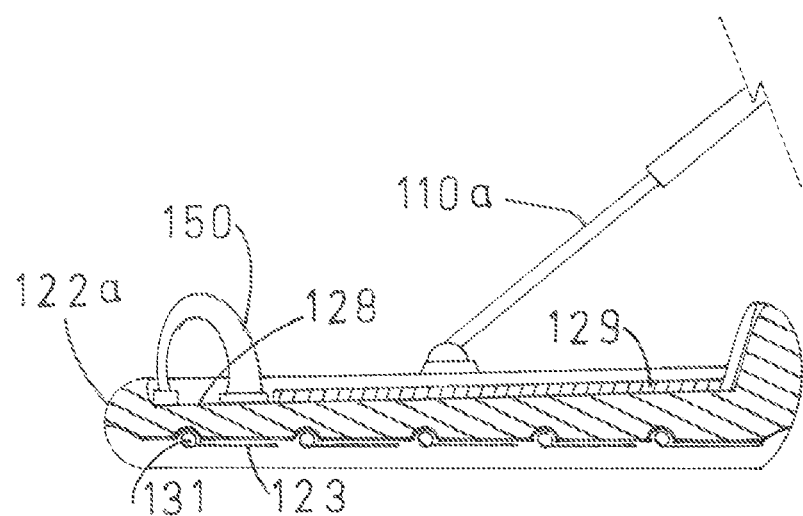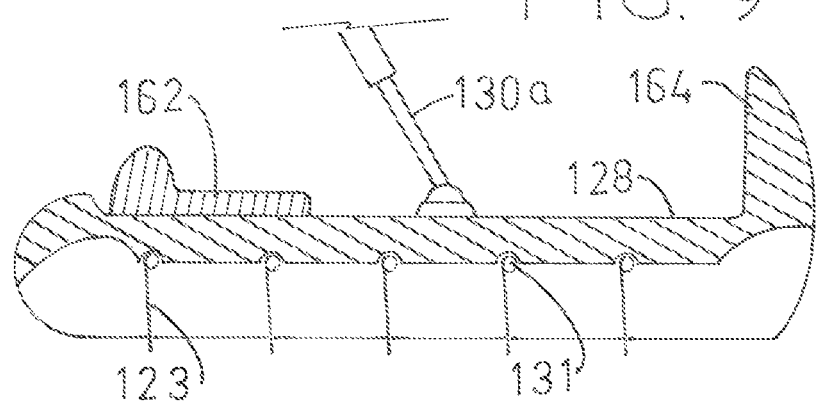

QUADRA WALKER

BRIEF SUMMARY OF THE INVENTION

Figure 1:
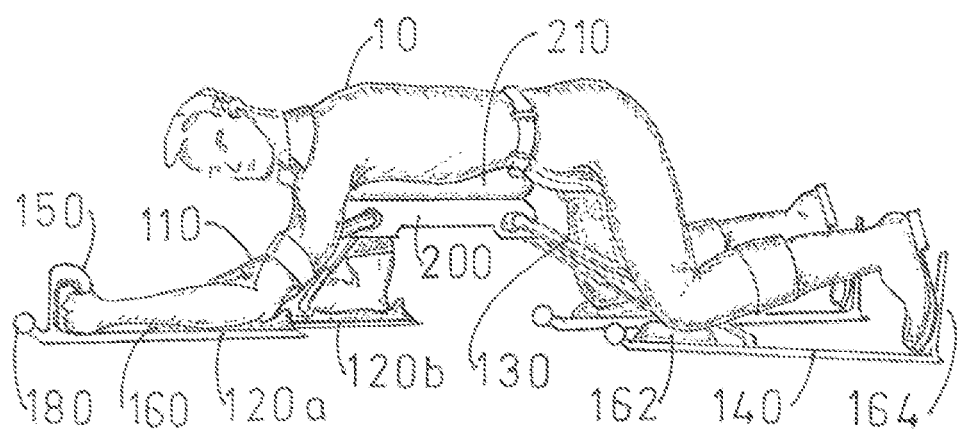

A walking mechanism having a seat and four limbs resting on skis. It is operated by a human being in a prone position, reclining his chest and belly on the seat, and engaging the four skis with arms and legs, walking close to the ground.

BACKGROUND AND FIELD OF THE INVENTION

There is no known mechanical apparatus enabling a human being to walk in a prone position, like a lizard, like a spider, close to the ground, using arms and legs as will be made possible with the Quadra Walker (QW) disclosed herein.

The invention includes new concepts in ski design for use with the QW. Traction positive skis provide wider access over a great diversity of landscapes.

Likewise, there is nothing resembling the QW for walking over water. The closest concept related thereto being an informal sketch by Leonardo Da Vinci showing a man walking on water in an upright position with the help of floats on his feet and floats at the end of hand-held poles, presumably for balance. There is no detail on the actual shape of the floats, nor any particular description thereof. Probably the floats were inflated hides with no provision for traction or for sliding motion on water.

Walking in a prone position, close to the ground, is a new concept which will afford human beings with a new travelling experience on open ground or through underbrush, through thick forests, climbing slopes or walking on water, and on the fields of competitive sports.

The QW enables a soldier to hug the ground while stealthily advancing over rocky tracts of land, under bushes and over protruding roots of trees, over sandy soil and over dry or damp, hot or cold field grounds. Instead of crawling or slithering on dirt while looking for a safe spot to hide, he can advance at a good pace, with clothes intact, jump over ditches, walk over obstacles, tread on water and cover long distances with much less effort.

The QW opens up a whole new dimension for sports as well. On the sports track the QW will be used in long distance running trials and all manner of speed and resistance competitions. Cross-country trials with a combination of land and water tracks will probably become a new category of competition made possible only with the QW.

Mountain climbing with the QW will open a new sports frontier with the use of four climbing limbs combined with the assistance of an energy source powering said limbs and the incorporation of traction-positive skis. The introduction of a mechanical hand placed at the front end of the front ski and prudently operated by the user, is a novel concept as well. Said mechanical hand is designed to grab and hold onto rocks, tree roots and other objects, providing the user with unprecedented anchorage during a steep climb.

The QW may even become the ideal equipment for rescue operations on steep mountainsides, mines and caves where other equipment cannot go. A QW with long limbs can lift and carry supplies underneath and/or even a human being on a stretcher.

OBJECTS OF THE INVENTION

The object of the invention is the provision of an altogether new walking mechanism affording human beings with a new form of transportation.

Another object is to introduce a new category of sports equipment for racing and endurance trials.

Another object is the introduction of transportation equipment suitable for safe crawling on adverse terrain.

Still another object is the provision of a new type of equipment available for rescue operations in places of difficult access.

Another object is the provision of equipment for walking safely on water, through shallow rivers and bayous and through pristine landscapes without causing damage or alterations thereto.

GENERAL DESCRIPTION OF THE INVENTION

The Quadra Walker is a new mechanical apparatus consisting of a seat and four limbs. Each limb is held at an articulated joint assembly located inside a central chassis box, under the seat, and is connected with a foot, ski or float at its other, lower, end. The four limbs support the chassis box at a given distance to the ground. Two limbs are placed at the front end of the chassis box, where they will be actuated with hands and arms; the other two limbs are placed at the back end of said chassis box to be operated with user's legs and feet. Limbs rest on skis or floats, for support and traction, with which they are flexibly connected. Skis are designed to both slide on the ground when pulled or pushed forward and to provide traction by holding on to the ground and when pushed backward. Floats are designed for floating on water, for sliding forward when pulled or pushed (as a ski) and to provide traction when pushed backward.

For some applications, the design may incorporate the addition of one or more wheels located below the chassis box, in direct support of the user. In this design, one or more wheels using adequate suspension means support the chassis box allowing the user to pass on most of his body weight to the wheels while using his arms and legs mainly for traction, stability and steering along a given path. The wheels have brakes, hand actuated with a lever located on the ski and connected via cables to the wheels. The suspension may be a single articulated arm resembling the landing gear of some airplanes; it includes adequate shock absorption and may be retracted or folded when the wheel is not in use. The number of support wheels is ideally kept to a minimum, but may increase according to use.

Quadra Walker may incorporate one or two stabilizer limbs, each with its own respective ski, instead of the support wheel(s) mentioned above. Stabilizers are preferably centrally located, in line, in front and back of the chassis box. Stabilizers share the load with the limbs but, while limbs move back and forth and may momentarily lift from the ground, stabilizers just slide and take weight. Stabilizers consist of limb and ski; the limb may be articulated and incorporate shock absorption means.

The general structure of the QW need not be heavier than a bicycle. It is designed for operational flexibility, capable of adjusting naturally to different contours on the field, which change continuously. Each limb is mechanically independent of other limbs, except when it is being operated in concert with the other limbs, as when a specific motion gait is selected as explained hereafter. Each ski engages the ground, slides, stops, rotates and lifts independently of the other skis. Each float floats, slides, stops, rotates and meets water depth and currents independently of the other floats.

There are many other applications envisioned for the QW. It can be used for ice skating and roller skating, activities which require specialized skis having blades or rollers. It can be used for rescue operations in remote and difficult to reach places such as ravines and caves. With the assistance of a mechanical hand, described in detail farther ahead, a rescuer may reach for ropes, remove debris and pull people and equipment. In difficult circumstances, a power-assisted QW would enable a rescuer to complete a mission which would otherwise be beyond human endurance.

In one embodiment of the invention, the joints holding the limbs are designed to move the limbs with a side crawling sweep as practiced in some swimming styles. For this type of motion, the upper end of each limb is secured inside the chassis box at a joint assembly where it is held firmly in place. The joint assembly itself consists of a turntable on a base designed to turn sideways, back and forth, in a semi-circular or swiveling movement of about 50 degrees, as the limb is moved by the user in a selected gait. Springs and shock absorbers may be employed to limit the expansion of the sweep.

In another embodiment, limb motion resembles a pendulum, with no side sweep. For this type of limb motion, the limb swings on a pivot, back and forth. Adjustable springs and shock absorbers check and stop movement at both ends of the swing. Limb swing may be circumscribed to within a range of about 50 degrees, but will be regulated by the user to agree with limb length, stride length and frequency of stride.

Each limb is articulated at one or more points between said chassis and the ski. Limbs stretch and contract during the walking motion by means of telescopic extensions and comprise springs and shock absorbers, as necessary. A slider-crank mechanism may be used to regulate walking motion and may be used as well in combination with an electric motor providing powered strokes thereto in a power-assisted design.

An alternative design for the limb consists of a coiled spring shaped to resemble the general contour of the articulated limb described above. It is fastened inside the chassis box at one upper end and connects with a ski at its distal end.

Power assistance for the limbs may take many shapes and forms, such as: (a) A battery providing power to electric motors which are in direct mechanical linkage with the limbs; (b) A first hybrid combination consisting of a power source powering electric motors which are used to operate hydraulic or pneumatic power delivery to hydraulic or pneumatic artificial muscles; (c) A mechanical power source, such as an internal combustion engine, powering hydraulic or pneumatic means; or (d) A second hybrid combination having an internal combustion engine driving a generator which, together with a battery, provide power to electric motors in the system.

State of the art batteries are remarkably powerful and may alone be relied upon to power linear actuators or linear motors incorporated in the limbs. The provision of powered strokes given directly to the reciprocating elements of a limb obviates the complications of providing for a centralized mechanical driver and the related linkage between driver and limbs.

Power assistance is supplied to the limbs under the following controlled parameters:

(a) Range of power intensity applied to limbs. It starts with a minimal push calculated to supplement the user's own efforts, overcoming the QW's own inertia and weight. Power may be increased gradually by the user until it reaches a full mechanical takeover of the walking effort, at which point the user would match the movements of the power-driven QW, or even be driven by the power being thus supplied.

(b) Range of speed, or gait frequency, selected from slow to fast.

(c) Selection of a walking gait in a motion cycle, such as running, trotting, walking and hopping, as further explained hereafter.

(d) Stride selection: short, medium or long with gradual adjustments therebetween. A short stride may be selected for conserving energy or to reflect the height and/or strength of the user. Stride length is also related to speed. Short strides bring about reduced speed and must be adjusted with a higher frequency if higher speed is sought.

(e) Limb length which is adjustable and is closely related to stride selection, stride length and frequency of gait. Limb length is discussed farther ahead.

Gait cycles described herein consist of limb motions× frequency=speed. Numbering the limbs as follows: Left Front=1; Right Front=2; Left Back=3; Right Back=4 we have the following gaits:

A: Trot 1&3 extend while 2&4 meet, simultaneously, then reversing: 1&3 meet while 2&4 extend, simultaneously B: Run 1&2 extend, reaching forward; 3&4 pushing backward, then reversing: 1&2 extending backward, meeting 3&4 which reach forward C: Walk 1&3 move forward simultaneously, followed by 2&4 moving forward simultaneously D: Saltatorial 3&4 push forward fast landing on 1&2, then repeating cycle E: Crawl May resemble the Walk Gait but: height of chassis is at its lowest (or almost), speed is minimal, preferably each limb being power-assisted on cue Power assistance is controlled by a properly programmed computer having a control panel that can be instructed by the user with digital or verbal commands to perform the following functions: gait selection, stride frequency, intensity of power applied to limbs and overall speed. The computer further registers weight of user, power availability from battery, speed, mileage, compass orientation, GPS location, ambient temperature and humidity in order to provide satisfactory range of movement prediction to user on a given intensity of power usage or a combination thereof.

Height regulation of the chassis box is an important aspect since the nature of the ground being traversed may change radically. Smooth ground may become rocky as the user advances along a given path, and may have to adjust height accordingly. Going from firm ground into a bayou or shallow water may require the user to lift the chassis box enough to stay above water. In a different scenario, a soldier advancing in stealth may change height several times along the way, adjusting for different terrain and finally seeking the lowest possible body height to avoid detection.

Rescue operations using the QW are made possible by carrying the rescued person in a hammock or stretcher hanging underneath the chassis box. For this type of operation the chassis box must be lifted high above the ground. The use of specialized longer limbs may even be necessary for special operations of this nature.

Height of the chassis box may be changed by adjusting the length of the limbs. A telescopic construction of the limbs may be regulated manually by fixing stops which determine range of sliding activity therebetween—one member sliding into the other. A pneumatic regulator, such as those used for office chairs may serve as well to change length of limbs.

In the case of a power-assisted Quadra Walker, the range of sliding activity in the limbs may be regulated by the computer. Thus, when limb length has been reduced to its minimal, and the QW is moving forward, sliding activity between telescopic limb members may increase in frequency to compensate for a reduced stride length or, inversely, lengthened limbs may require a reduced gait frequency for a given speed.

Instead of adjusting limb length to regulate height, or in addition thereto, overall height may be adjusted at the chassis box. There are four joint assemblies inside the chassis box, one for each limb; each joint assembly is connected to a height regulator which allows the chassis box to be moved closer to, or away from, the ground.

The height regulator is an elevator positioned at the center of the chassis box, designed and positioned to engage and work with the limb joints. It consists of a threaded stud topped with a head member. The head member has four concave cavities, each one shaped to engage with its corresponding joint-base end. As the elevator head is driven up or down, it changes the angle at which the joint bases sit and consequently the angle at which the limbs are secured, regulating the height of the chassis box thereby.

The chassis box is the mechanical center of the Quadra Walker. It is also the seat on which the user rests on chest and belly when operating the QW. For this purpose the top chassis box is covered with a contoured cushion designed to provide comfortable support without obstructing the movement of arms and legs of the user. There is also a strap or belt provided to hold the user in place; said strap may be firm but stretchable and easy to connect and disconnect. When the QW is equipped with a power plant to assist the operator with mechanical driving power, said power plant is located inside, or attached to, the chassis box as shown hereafter. A computer regulating the assistance of power and other functions is also attached to the chassis box. Another component is the front-view mirror which allows the user, in a prone position, to see the road ahead while facing the ground.

Arms and legs of the user, in one embodiment, rest directly on their respective front and back skis or floats which are equipped with adequate grips, cushions and restraining means such as straps or belts. User arms and legs, however, may rest on remote supports. These are similarly shaped and cushioned supports located at a given location along the length of the limbs, away from the skis or the floats, as the case may be. For example, traversing through shallow water or deep snow may be better served with the use of long limbs and respective supports located away from the skis or feet, as the case may be. This construction is also desirable when longer limbs are selected for specific applications such as running or trotting with long strides. In a saltatorial gait competition involving the use of longer hind limbs, the user's legs would not be able to reach the skis on the ground, needing therefore a closer support—away from the ski—to work on.

There are other applications for long limbs with remote supports which will be chosen for specialized competitions on the sports racetracks, just as there are different running trials and different swimming style competitions in the field of sports.

In the field of rescue equipment, a specialized QW is fitted with long limbs enabling it to carry a hanging payload beneath the chassis box. The payload may be equipment, food and medicines or a person on a stretcher or inside a hammock or similar hanging device. In this application, the user will need power assistance and the use of said remote supports on long limbs.

The front ski for use on land consists of a slat with an upper surface cushioned and contoured for nestling the forearm, with a handle at the front end for the hand, and a joint located sideways at about the center, lengthwise of the slat, where it connects with the lower end of the front limb. The lower surface of the slat is designed to slide on different surfaces such as dirt, gravel, sand, and grass when pushed forward and to provide traction when pushed backward. Traction is enhanced with properly oriented contours and with additional—and optional—protruding claws or nails which engage the surface of the ground when pushed backward and which fall back when the slat is pushed forward.

The back ski for use on land consists of a slat with a cushioned upper surface at the front, for the knee, and with an upright stiff pedal at the back, for the user's foot to press on. The limb connects with the ski at about the center from front to back. An adjustable fit may be provided to adjust this limb-ski connection. There are one or more belts to secure the leg in place. As with the front ski, the lower surface slides when pushed forward and provides traction when pushed backward.

The front ski for use on water is a float. It consists of a strong core slat with an upper surface cushioned and contoured for nestling the forearm, a strong grip placed in front and there is a connection with the lower end of the front limb. The bulk of the float is made of floating material built around—but mainly along—the two longer sides of said center slat, forming an elongated channel centered, lengthwise, therebetween, where water may flow freely along the direction of travel. Nestled on the upper surface of said channel, i.e. below the bottom side of the slat, are located a multiplicity of oars which open downward and engage the water when the float is pushed backward, and turn back to a closed position when the float is pushed forward. Oars may be placed in other places and may assume different shapes, according to design.

The back ski for use on water is a float. It is similar to the front float except for some characteristics. It is preferably longer than the front float to accommodate for leg size, the deck has a cushion for the knee and at the back end there is an upright stiff pedal for the foot and there are belts for securing the leg in place, as necessary.

It is foreseen that when water-walking becomes a common sport, the QW will be customized with power accessories such as propellers or jet nozzles added to the floats. These additions are obvious in view of this disclosure and considered proprietary.

The ski design for mountain climbing may vary according to the characteristics of the enterprise. Traction may be emphasized over sliding ability in order to secure a firm hold on a slope. Thus, the ground-contacting surface has a ground-hugging, rugged tread finish which engages the ground when the ski is pushed backward and which is able to slide forward. For some uses, the ski may incorporate fixed or retractable claws for engaging the ground. Both front and back skis may comprise, in one embodiment, a talon at the back end which tilts downward in order to engage ground or rock when pushed back. A variation of the talon is a ratcheted spur-like, star-shaped wheel. It is preferably placed at the back end of the ski and is designed to engage with the ground for support when pushed backward and to disengage, rotating freely, when the ski is sliding forward.

Another mechanism, useful for mountain climbing and other applications, is the mechanical hand. It is preferably placed at the front end of the front ski, enabling the user to grasp rocks and trees and other objects in order to obtain a firm hold on the ground. In one embodiment, the articulated hand is operated with a joystick which may double as a grip or handle. When the joystick is tilted or pushed forward, the hand assumes a disengaged (open) position; when the handle is tilted back, the hand closes in a grasping motion that enables it to hold firmly and engage with a boulder, a protruding rock, tree roots or some other firm object on the ground.

The mechanical hand resembles the human hand in general shape, mainly as the phalanges and metacarpals are concerned. The construction shown here has four extended phalanges and metacarpals, in a central position, fanning out a few degrees and bordered by two thumb-like phalanges on either side. The design may adopt variations such as a hand having more phalanges, or less, some longer, some even shorter. Phalange and metacarpal sections may comprise each a multiplicity of claws or teeth facing downward, like a saw, and oriented backward to enable grasping and securing hard objects such as boulders and rocks to obtain firm traction thereby. It is clearly understood that the number and size of claws may vary according to different applications and claws may stand alone or may sit between rubber nuggets placed there to enhance traction. The phalanges are strong enough to provide safe anchoring and capable of digging into the ground to obtain some traction in the absence of rocks or of protruding tree roots.

The mechanical hand is actuated with cables, one for each phalange. There is one cable running inside each phalange and its corresponding metacarpal and carpal sections. All cables gather at a tunnel in the carpal section where they run in parallel for a stretch, connecting with an actuating lever at their farthest end. Each cable is connected first with a lock in the distal phalange and runs through guides located in each one of the following phalange sections. All sections—distal, intermediate and proximal—are joined together with joints or pivots at which points the phalanges turn, closing in response to the tightening of the cable. Springs located at the joints of the phalanges push said phalange sections back into an extended position. A complete description of the inner workings is provided further below.

The mechanical hand may be operated with the assistance of a linear actuator powered with a portable energy source. The linear actuator may be located in mechanical engagement with the joystick, providing for a powered operation. In another configuration, there may be individual actuators for every one or more phalanges in the hand. These actuators may engage the cables used to operate the phalanges and may be located at any convenient point between the joystick and the carpal box.

The use of pneumatic artificial muscles in combination with the mechanical hand is also contemplated. Pneumatically or hydraulically operated muscles are well known and commercially accessible. For operation they require an associated air compressor or hydraulic pump in combination with electrically operated valves.

In another configuration, the joystick is used to activate a master cylinder connected via appropriate tubes to pneumatic artificial muscles located between joystick and phalanges. The user provides all the energy needed to operate this equipment, there is no power assistance, obviating the use of an electrically powered air compressor.

IN THE DRAWINGS

Figure 2:
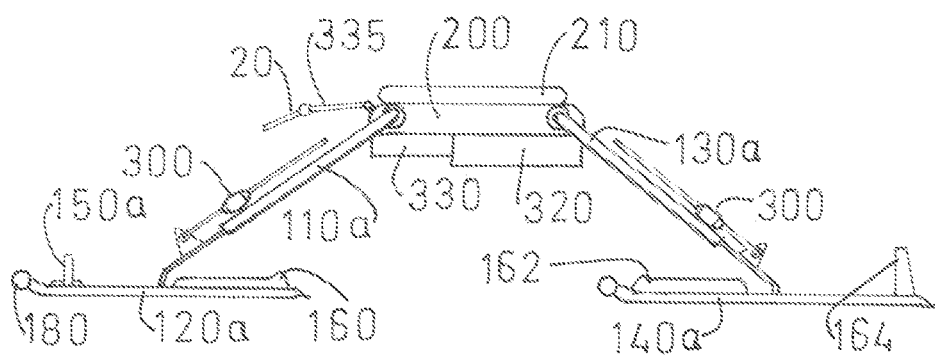
Figure 3:
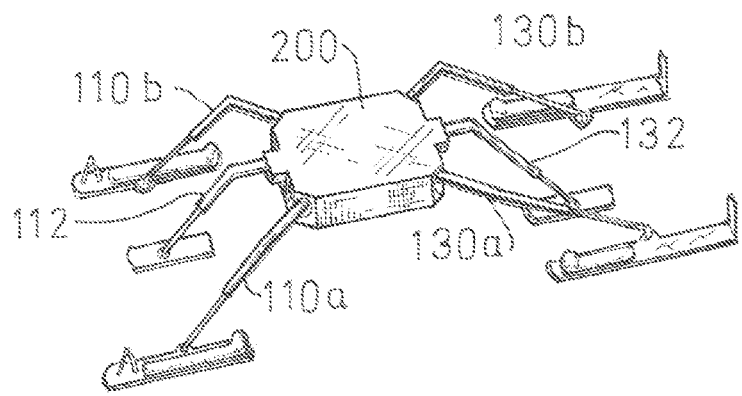
Figure 4:
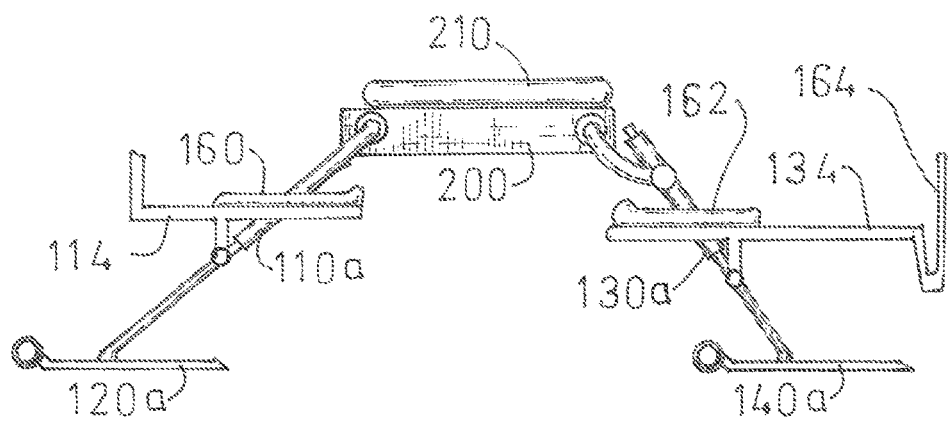
Figure 5:
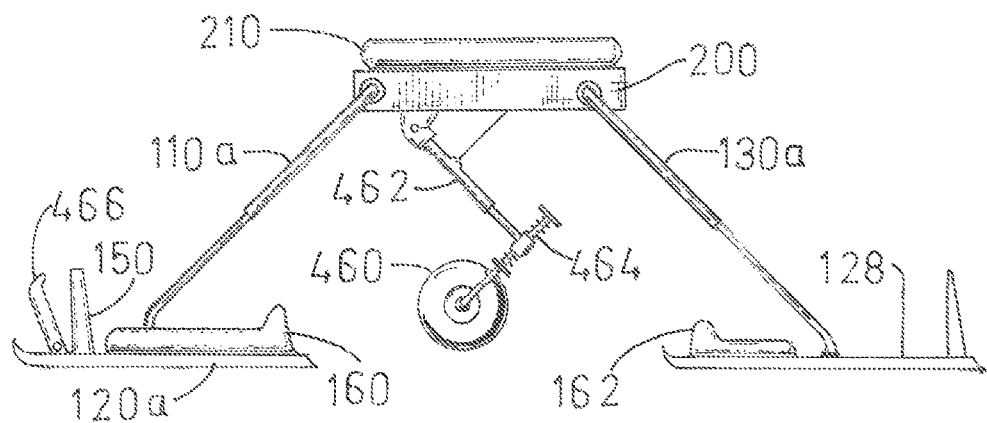
Figure 6:
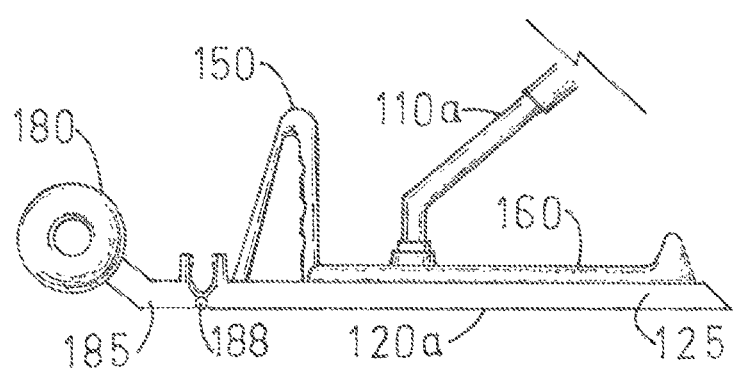
Figure 7:
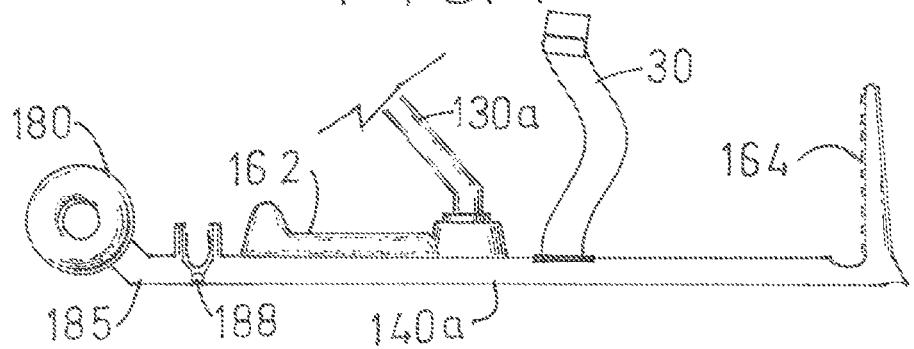
Figure 10:
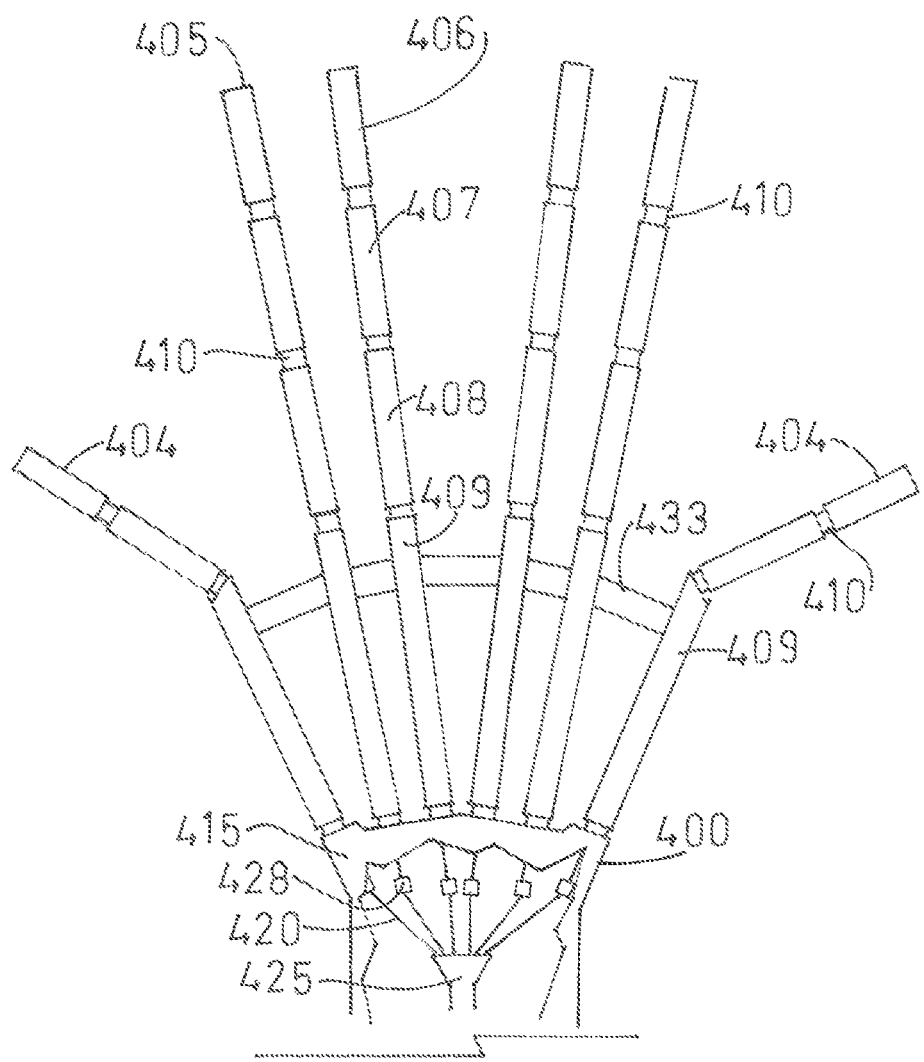
Figure 11:
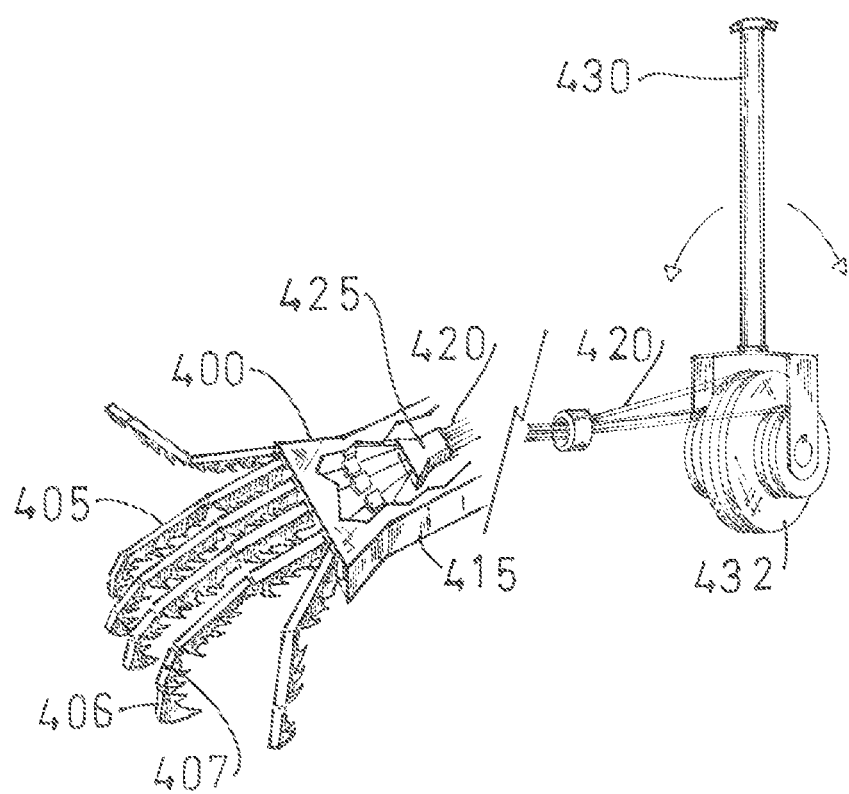
Figure 12:
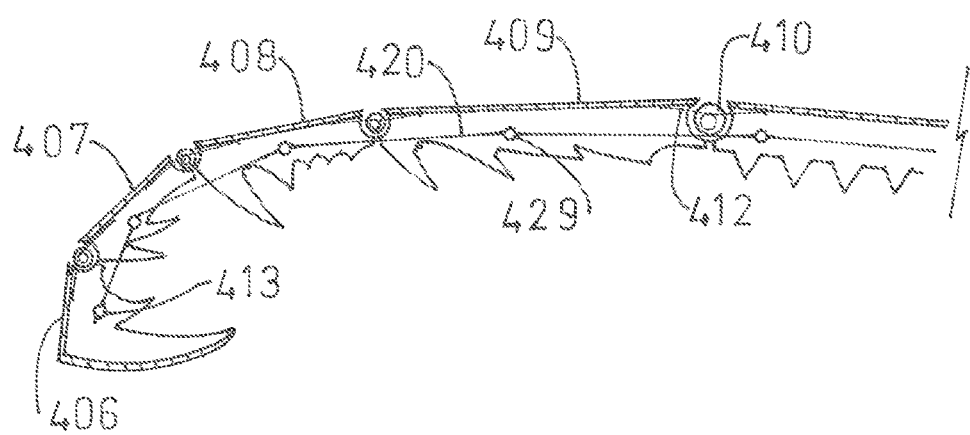
Figure 13:
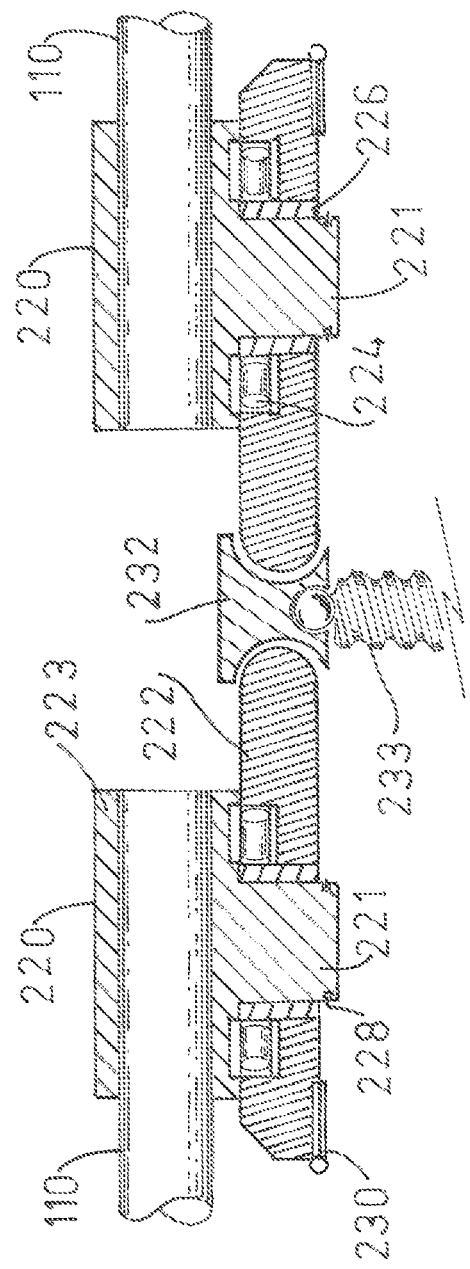
Figure 14:
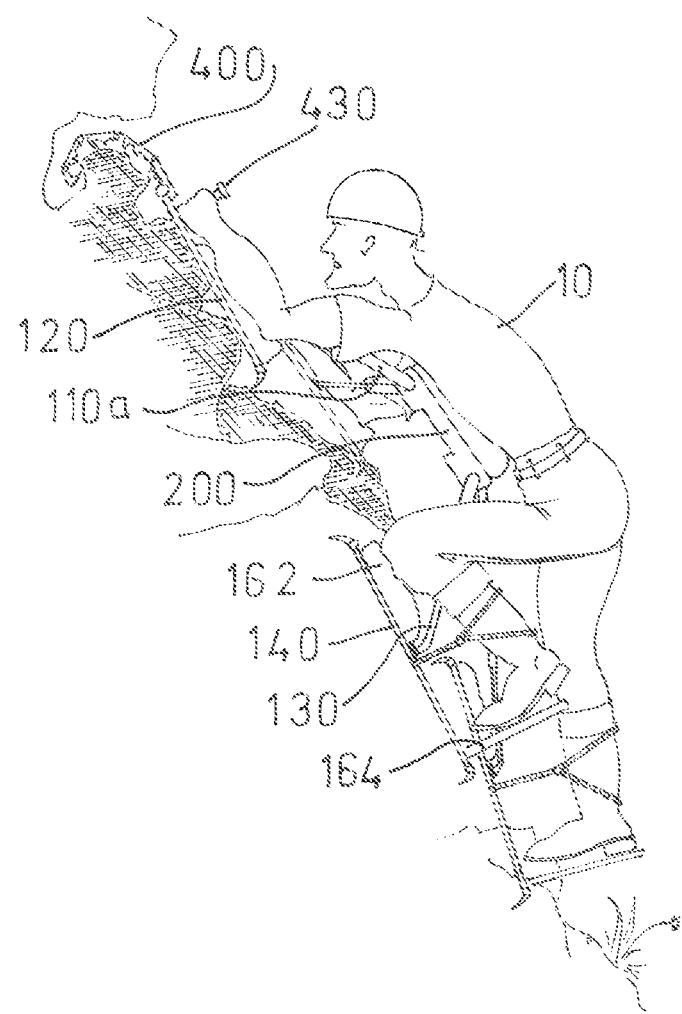

FIG. 1 is a side view perspective of the Quadra Walker in use.
FIG. 2 is a side view of the power-assisted Quadra Walker.
FIG. 3 is an artistic rendition of the Quadra Walker featuring front and back stabilizers.
FIG. 4 is a side view of a different modality of Quadra Walker featuring hand and leg supports located near the chassis box, away from the skis.
FIG. 5 is a side view of the Quadra Walker featuring a support wheel.
FIG. 6 is a diagram of a front ski.
FIG. 7 is a diagram of a back ski.
FIG. 8 is a diagram with cut-away view of a front ski-float.
FIG. 9 is a diagram with cut-away view of a back ski-float.
FIG. 10 is a diagram of a mechanical hand.
FIG. 11 is a composite perspective of a mechanical hand and its corresponding control lever and actuating cables.
FIG. 12 is a side cut-away view of a phalange.
FIG. 13 is a side cutaway view of two opposed joints connected by centrally-located elevator means
FIG. 14 is a side view of a Quadra Walker in use featuring the mechanical hand in use.

DETAILED DESCRIPTION OF THE INVENTION

The essential concept of the Quadra Walker (QW) is depicted in FIG. 1. It consists of one central chassis or box of joints 200 holding two front limbs, left 110a and right 110b, and holding two back limbs, left 130a and right 130b. Said front and back limbs connect with respective front skis 120a and 120b as well as with back skis 140a and 140b. Joint box 200 is topped with contoured cushion 210 where user 10 rests on chest and belly while operating front skis with arms and back skis with legs. User 10 holds front skis 120a,b by respective grips 150 and rests forearms on cushioned respective surfaces 160; said user rests legs on back skis which feature each cushioned knee-rest 162 and foot rest 164. Front and back skis are depicted each with optional bumper wheel 180 which lifts the front end of the ski, enabling it to slide over an obstacle whenever it is encountered.

FIG. 2 is a side view of a power-assisted QW. Linear motor 300 straddles the two telescopic members of limb 110 to assist the operator in extending and contracting said limb, actions which take place during walking. Battery 320 is shown tucked just beneath joint box 200, beside brain 330 just for illustration purposes. Control panel 335 is located in front where operator can see status of operations and issue orders by touch or voice. Said control panel may be slid forward and tilted as necessary by the user. Mirror 20 is at the very front for this illustration and is position-adjustable, providing the user with a forward view while moving. Ski grip 150a doubles as a joystick; it is connected to brain 330 and provides user 10 with the alternative of overriding programmed instructions to motor 300. Joystick 150a located in front left ski can be programmed to control both front and back left skis. Likewise, the joystick located in the right front ski may control both front and back right skis.

Brain 330 is a computer programmed to control the operation of all the powered assistance means used with the QW. Brain 330, in combination with the control panel 335 and battery 320, is programmed to issue operational orders to said linear motors in accordance and in simultaneous combination with variable particulars selected by the user. These are, among others: (i) length of limbs; (ii) length of stride; (iii) frequency of stride; (iii) gait selection; (iv) selection of motor speed. The combination of length of stride and frequency of stride help determine speed, independently of the speed selected for the powered assistance.

Brain 330 is programmed to mix applications as freely as the user may select to combine them. Combining length of limbs with gait, speed and stride length provides all the versatility needed to adapt to changing landscapes. For example, a soldier in combat may first advance with extended limbs at a quick trot followed by a change of height with shorter limbs but greater frequency of stride to maintain same velocity and then slow down adopting a crawling gait, receiving power assistance on cue followed by a jump or two in saltatorial gait, avoiding exposure while trying to reach a new hiding spot.

During a sportive cross-country competition, a quick trot may be the only gait allowed while, in a different setting, a climber will need a combination of different styles of locomotion, including the use of the mechanical hand 400 described further ahead and illustrated in FIGS. 8-10. In cases where speed or frequency are of lesser importance, or when the user is trying to conserve stored battery power, power assistance may supplied on cue. In other trials, yet to be defined, limb length and shape may figure prominently in the selection of locomotion style which will respond to a specific set of computer instructions.

FIG. 3 is a QW variant, shown with central stabilizers front limb and ski 112 and back limb and ski 132 in addition to standard limbs discussed above, becoming an hexapod. Stabilizers are designed to share the load with front limbs 110 and back limbs 130, enabling the user to lift one or another ski with greater ease. Stabilizer limbs are not used for pushing or pulling, only for support.

Stabilizer skis may incorporate wheels for some applications, such as the race track. The addition of a set of wheels in direct support of the chassis or joint box 200 as shown in FIG. 5, in combination with moving limbs and stabilizers, is also contemplated for some uses.

FIG. 4 illustrates an alternative construction of the QW. In this design, the user does not operate directly on the skis but rather on equivalent support members —114 for the arms and 134 for the legs—located on the limbs but away from the skis. This construction allows the use of longer limbs, similar to walking on stilts, which may be valuable for traversing shallow rivers and bayous and a number of other grounds. Moreover, a long-limbed configuration may give way to other activities such as frog-like jumps, propelling the user farther albeit with a greater expense of energy which, however, the power-assisted version may actually compensate.

FIG. 5 illustrates the use of a support wheel 460 located below chassis box 200. Wheel 460 is connected to said chassis box with retractable arm 462 having adequate shock absorption means 464 such as springs and the like. Wheel brakes, not shown, are actuated with lever 466 located at the front end of the skis, connecting with the wheel with cables or hydraulic means. Similar in function and purpose to the stabilizers of FIG. 3 described above, the support wheel provides direct support to user who continues to use four limbs for propelling, stopping and balancing actions. Balance on the wheel may be attained with practice for coasting down suitable tracks.

FIGS. 6 and 7 illustrate basic features of front and back skis. FIG. 6 is a side view of front left ski 120a connected at mid-length to front limb 110a. The ski consists of slat 125 as the main body part topped with cushion 160 on deck 128 and hand grip 150.

Optional ski features will be added or discarded in accordance with ground characteristics. For irregular ground, bumper wheel 180 located at the front end of the ski, is employed to roll over obstacles. Pliable front slat section 185 comprises spring and hinge 188 which, combined with bumper wheel 180, provide instant adjustment to bumps along a track.

In FIG. 7, back ski 140 resembles the front ski in most features, but is specifically adapted to be operated by the leg and foot. Knee rest 160 on deck, foot rest 164 at the back of the ski, and strap 30, help secure the leg in place during use.

FIG. 8 depicts left front float 122a in a cut-away view. The main body mass of the float (or ski-float), depicted with hatchings, is provided for flotation. Floats used with the QW enable the user to walk on water. The ski-float features cushioned deck 129, grip 150, oars 123 and front limb 110a connected at or near the center, lengthwise, of the ski-float. Oars 123 are shown eight in number and in a closed or sliding position. Number and size of oars may vary according to new designs and said oars may be placed differently, all falling within the scope of this invention. Oars depicted in this illustration are placed below deck, lengthwise, in-between two elongated portions of body mass, portions which define a central channel in the shape of an inverted U designed to allow the float to slide ahead while slowing down sideward motion.

In use, the float sinks to a predetermined level which places oars 123 just below water level. When the float is pushed backward, oars 123 are pushed open by the water entering the open space defined between oar and body mass. Oar 123 is kept in a closed position by an associated spring (not shown), turning on pivot 131 when pushed open (downward) by the flow of water. Open oars provide traction, as shown in FIG. 9, allowing the user to move ahead by pushing backward. When the float is no longer pushing backward, and when it travels forward, oars 123 close (folding upward) providing a smooth surface which allows the ski to slide easily.

FIG. 9 is an illustration of the back float. Oars 123 are shown in the open position between sidewalls. In this illustration right-side sidewall 124 is shown to be a continuation of the body mass which includes deck 128 on which knee rest 160 is attached. Foot rest 164 is located at the back end of the ski-float and is a continuous part of the body mass. Back limb 130 connects with float deck at approximately mid-way between fore and aft.

FIG. 10 is an upper view of mechanical hand 400 having four long phalanges 405 of about the same length fanning out frontally and two smaller side phalanges 404, one at each side and all held together at carpal box 415. Optional bridge 433 joins and reinforces the phalanges. Phalanges 405 may be more or less in number as well as longer, shorter or more robust for heavy duty.

Phalange sections as shown in FIGS. 10 and 12 turn on pivot junctions 410 where integral springs 412 push sections back into an extended position. Cables 420 running along tunnel 425, through carpal guides 428 and then through section guides 429 inside the phalange, pull phalanges 405 into a closed, clasping position when activated with lever 430, shown in FIG. 11.

FIG. 11 is a depiction of mechanical hand 400 in a perspective view as connected to remote lever 430 by way of cables 420. Lever 430 is mechanically connected to pulleys 432 on which cables 420 coil.

Field experience will tell whether it is better to have all phalanges 404 and 405 closing simultaneously when clasping an object or whether another sequence is preferable. For some uses it may be better to have the central phalanges set to initiate the clasping action, closely followed by the remaining phalanges. In the electrical and hydraulic versions of hand 400 disclosed farther ahead, power applied to each phalange may be calibrated and rate of clasping action customized as well. Simultaneous closing of all phalanges could have the negative effect of putting side phalanges in the way of larger phalanges when closing on the object being grasped.

In this illustration, there is one cable per phalange. The rate at which each cable is pulled is the rate at which each phalange closes, rate which is ultimately determined by the diameter of its corresponding pulley. In FIG. 11, for the purpose of illustrating a convenient modality, the two central pulleys are shown to be of a larger diameter than the four side pulleys. When lever 430 is tilted backward, all cables leading to the hand are stretched tight; since all pulleys 432 are held together as a single unit, they all rotate simultaneously but larger pulleys pull more cable than smaller ones. In this way, phalanges connected to bigger pulleys will clasp faster and farther than phalanges connected to smaller pulleys. Clasping action may be regulated differently when using electric, hydraulic or pneumatic means.

FIG. 12 is a cutaway view of a single long phalange 405 consisting of distal section 406, intermediate section 407, proximal section 408 and metacarpal section 409 joining with carpal box 415. Sections are held together, and turn on, pivot junctions 410, providing articulation to the phalange. Cable 420 runs through section guides 429 located at each phalange section, beginning with distal section 406 where lock 413 secures the end of said cable. Spring 412 located at each said junction pushes sections back into extended position when cable 420 eases tension.

In FIG. 10 small phalange 404 is depicted with only two sections, skipping the proximal section of the long phalanges. As with the long phalanges, this depiction is meant only for illustration purposes. Phalanges may be longer or shorter and each may have more or less sections, all within scope of this invention.

The sections of phalange 405 show a particular distribution of claws which may vary in other designs, according to intended use and to field experience developed therewith. Phalanges may be made without claws and with any type of material and in any given shape that will provide the type of grip desired.

In FIG. 12, distal section 406 has one big foremost claw followed by a smaller one. The same pattern of claws is followed with the intermediate 407, proximal 408 and metacarpal 409 sections. In this particular construction, secondary claws are made smaller to keep them from obstructing the clasping action of the closing phalange. Carpal box 415 shows a serrated lower surface designed to engage and hold, preventing slippage, on a hard surface.

Mechanical hand 400 of FIGS. 10, 11 and 12 is essentially the illustration of the manual version which is wholly powered and operated by the strength and actions of the user. The torque resulting from the power applied by lever 430 to pulleys 432 provides all the power needed to operate phalanges 404 and 405. Mechanical hand operation, however, may be power assisted with electrical power means and may employ hydraulic or pneumatic means for delivering said power assistance, which are also contemplated in this invention.

Using battery 320 as an electrical power source, it is possible to provide powered assistance to the operation of hand 400. In one instance, power may be supplied on cue directly to lever 430 and pulleys 432 unit by an electric motor, not shown, to supplement the physical effort of the user. Power is regulated to any desired degree of assistance, from low to full force. In another embodiment using battery 320 or similar as a power source, solenoids or linear actuators may be employed to power every cable 420 under conditions controlled by the user. A desirable location for the solenoids is the carpal section between guides 428 and tunnel 425, with the provision of proper spacing.

Hand 400 may be operated with hydraulic means as well. The hydraulic model consists of a master cylinder, operated with lever 430, connected to slave cylinders located in the carpal section of the hand. Each slave cylinder is connected to its corresponding phalange 405 by means of its corresponding cable 420. Carpal box 415 may be made longer and/or wider to accommodate all the slave cylinders needed for the operation of the phalanges, especially in the case where every phalange is connected to its own calibrated slave cylinder. When two or more phalanges share the same timing, distance and velocity of clasping, it is possible to combine the use of one cylinder for several phalanges by varying the force and displacement applied to said individual slave cylinder.

FIG. 13 is a cutaway side view of joint assembly 220, of which two opposing units are illustrated with elevator 232 in-between both. Each said assembly consists of turntable 223 and base 222. Turntable 223 has a cavity for securing limb 110 tightly in place and a lower shaft portion 221 for rotation inside base 222 movably supported with thrust bearing 224 and bushing 226. Lock ring 228 keeps shaft in place. At one end, base 222 rests on hinge 230 and at its other end engages with the cavity of elevator 232.

During the motions of walking, limb 110 held in turntable 223 oscillates back and forth within an angle of about 60 degrees, which may vary in accordance with the length of the stride. Turntable 223 may oscillate more than 60 degrees if necessary and the range may be reduced or checked as well with the addition of fixable stops (not shown).

Elevator 232 of FIG. 13 engages with the base 222 of each one of four joint assemblies located inside joint box 200. Elevator 232 has four side cavities, each one set for engaging a corresponding end of base 222. Elevator 232 goes up or down by turning integral threaded stud 233 held at the base of the chassis box by an appropriately fixed nut.

When joint assembly 220 is pushed up or down by elevator 232, it turns on its hinge 230, changing the angle at which it is held. This action changes the angle of limb 110 as well, which changes the height of the entire joint box 200, and therefore, the height of the QW as well. Height of the QW, then, reaches its top operating height when joint 220 tilts on hinge 230 at an approximate angle of 45 degrees or so, and its lowest height when joint hinge 230 is closed, at 0 degrees of inclination, as shown in this illustration. Joint characteristics may vary according to design and so QW height adjustment means will reflect these variations as well, all within scope of this invention.

FIG. 14 illustrates the QW model used for climbing rocky slopes. User 10 rests on cushion 160 atop joint box 200, holds front ski 120 and is strapped to back ski 140. User holds on to lever or joystick 430 which doubles as a grip for activating mechanical hand 400 located at the front end of ski 120, obtaining a firm hold on the rock ahead. Talons 190 located at back end of front and back skis dig into ground or hold onto rock, anchoring user 10 to the slope.

Having described and illustrated the invention, I claim:

1. A four-limbed mechanism named Quadra Walker operated with arms and legs by a human being in a prone position, for walking over diverse surfaces, characterized by a central chassis box containing a set of articulated joints connected to four limbs of the mechanism, where two front limbs of the four limbs are designed for hand and arm use and two hind limbs of the four limbs are designed for leg and foot use, and where each one of the four limbs connects with a ski at a distal end;

the skis being suitable for ground travel, each consisting a slat member having a lower surface adapted to provide both traction and sliding activity, an upper section adapted to engage with the user arm or leg and a forward section having an optional bumper wheel designed to roll over obstacles in a forward travel and adapted to bend upwardly by means of a hinge and spring mechanism;

a front ski deck surface having a grip located at a front end and an associated cushion member for the forearm;

a hind ski deck surface having a cushion member for nestling the knee and an upright foot rest member adapted to be pressed on by the foot;

adequate straps to secure the arms and legs to the respective skis;

a wheel unit connected to the chassis box;

one or more stabilizers connected to the chassis box, comprising an elongated member having the respective ski at the distal end;

a power plant inside the chassis box for providing mechanical assistance to the four limbs for locomotion;

a computer programmed to control power assistance to the four limbs, controlled by the user via a control panel.

2. Quadra Walker as set forth in claim 1, characterized in that the chassis box is a strong structure having, in combination, a cover suitable for holding a cushion where the user can rest on chest and belly;

side ports for accessing the walking limbs;

an elevator mechanism consisting of a threaded stud having an upper head with cavities in working relationship with the articulated joints in the chassis box;

means for enclosing the power plant, the computer and the control panel.

3. Quadra Walker as set forth in claim 1, characterized in that the walking limbs consist of at least two elongated portions adapted to extend and contract by means of tubular members arranged in a telescopic assembly to contract and expand, wherein one end of each of the four limbs is adapted to engage with the ski at one end and adapted at its other end to engage with the corresponding articulated joint located inside the central chassis box.

4. Quadra Walker as set forth in claim 1, characterized in that the wheel unit is comprised of one or more wheels held at a lower end of a retractable arm which is connected to the chassis box, said retractable arm comprising adequate shock absorbing means; said one or more wheels being furnished with adequate braking means actuated by cable or hydraulic lines by the user.

5. A four-limbed mechanism named Quadra Walker operated with arms and leg by a human being in a prone position, for walking over diverse surfaces, characterized by a central chassis box containing a set of articulated joints connected to four limbs of the mechanism, wherein two front limbs of the four limbs are designed for hand and arm use and two hind limbs of the four limbs are designed for leg and foot use, and where each one of the four limbs connects with a float at a distal end; the floats have an elongated body shape made of floating material and have a multiplicity of submerged pivoted oars, held in a closed position for sliding forward, and said oars being pushed open by the action of water when the float is pushed backward, thereby providing traction for forward travel;

a front float deck surface having a grip for the hand located at a front end and an associated cushion member for the forearm;

a hind float deck surface having a cushion member for nestling the knee and an upright foot rest adapted to be pressed by the foot;

adequate straps to secure the arms and legs to the respective floats; a wheel unit connected to the chassis box; one or more stabilizers connected to the chassis box, comprising an elongated member having the respective float at the distal end; a power plant inside the chassis box for providing mechanical assistance to the four limbs for locomotion; and a computer programmed to control power assistance to the four limbs, controlled by the user via a control panel.

\* \* \* \* \*